United States Patent [19]

Freywiss

[11] Patent Number: 5,078,021
[45] Date of Patent: Jan. 7, 1992

[54] MULTI-AXIS MECHANICAL MANIPULATOR

[75] Inventor: Eric Freywiss, Paris, France

[73] Assignee: S.O.P.A.P. Limited Company, Paris, France

[21] Appl. No.: 427,113

[22] PCT Filed: Jan. 30, 1989

[86] PCT. Pub. No.: PCT/FR89/00031

§ 371 Date: Oct. 17, 1989

§ 102(e) Date: Oct. 17, 1989

[87] PCT. Pub. No.: WO89/08012

PCT Pub. Date: Sep. 8, 1989

[30] Foreign Application Priority Data

Feb. 23, 1988 [FR] France .................... 88 02280

[51] Int. Cl.⁵ .............. G05G 11/00; F16H 25/16; B25J 19/00
[52] U.S. Cl. .............................. 74/479; 74/57; 74/665 C; 74/411; 74/470; 414/590; 901/49
[58] Field of Search ............. 74/57, 89.14, 470, 479, 74/411, 665 C, 412 TA, 582; 901/12, 17, 18, 23, 49; 414/590, 744.3

[56] References Cited

U.S. PATENT DOCUMENTS

| 2,579,642 | 12/1951 | Bachman | 74/57 X |
| 3,080,765 | 3/1963 | Eisele | 74/57 |
| 3,359,819 | 12/1967 | Veillette et al. | 74/411 X |
| 3,406,583 | 10/1968 | Baier | 74/411 |
| 4,293,268 | 10/1981 | Mink | 414/591 |
| 4,344,729 | 8/1982 | Orsinger et al. | 901/49 X |
| 4,514,616 | 4/1985 | Warner | 219/136 |
| 4,639,184 | 1/1987 | Knasel et al. | 901/49 X |
| 4,741,642 | 5/1988 | Carlton | 901/49 X |
| 4,770,055 | 9/1988 | Chevance et al. | 74/411 |

FOREIGN PATENT DOCUMENTS

| 2451250 | 9/1984 | France. | |
| 2046201 | 11/1980 | United Kingdom | 901/12 |
| 2189769 | 11/1987 | United Kingdom. | |

Primary Examiner—Leslie A. Braun
Assistant Examiner—Julie Krolikowski
Attorney, Agent, or Firm—Cushman, Darby & Cushman

[57] ABSTRACT

In a multi-axis mechanical manipulator with adjustable travel and protection against overloading. The movement is transmitted to the indexing mechanism (10) by the combination of a sliding rotor motor (2) of a reducing gear with wheel and endless screw (30) and an adjustable torque limiter (40). The law of motion of the indexing mechanism (10) is determined in this way so as to obtain constant speed over a wide range, possibly with stopping points. The rotating frame (56) is linked to the indexing mechanism (10) by a spring bushing (50). The movement is transmitted to the cylindrical cam (6) by an adjustable torque limiter (28). The manipulating arm (7) is displaced by a spring plate which permits a momentary angular retraction of the arm (7) when it encounters an obstacle. The present invention may be used for the handling of loads or parts.

6 Claims, 3 Drawing Sheets

MULTI-AXIS MECHANICAL MANIPULATOR

BACKGROUND OF THE INVENTION

1. Field of the Invention

The invention relates to a multi-axis mechanical manipulator with adjustable travel and with complete protection against overloads.

2. Description of the Prior Art

A wide variety of bi- or triaxial mechanical manipulators already exists, differing principally in the indexing mechanism used: global cam, paired flat cams, and cylindrical cams. This last means is reserved principally for triaxial mechanical manipulators.

Nevertheless, despite the undeniable advantages of compact construction, high precision, high transfer speed, controlled acceleration, positive positioning, reduction of idle time, and so forth that these indexing mechanisms offer, they have the disadvantages associated with rigidity, which are:

- the movements are sluggish; the linear and angular displacements are fixed and are not adjustable;
- the laws of motion are selected to obtain optimal acceleration and deceleration conditions, which yield a maximum speed at mid-course;
- the stops at mid-course translate into pronounced shocks, because in the majority of cases the indexing mechanisms are driven by a sliding rotor motor and a worm wheel reducing gear.

Moreover, if the output shaft becomes stuck in the locked position, there is a risk that the rollers or cam will break, because they are located in the zone of stoppage of the cam.

The angle of cam/roller pressure is equal to zero, so that in the presence of even slight torque exerted on the camshaft the forces on the rollers tend to infinity.

To prevent the risk of breakage, torque limiters that are triggered in the case of blockage are typically used, but they entail the following disadvantages:

- after triggering, the initial position of the manipulator platform or arm must be searched for; this requires precise knowledge of the material and often as a result means a stoppage in production, resulting in losses in productivity;
- upon triggering, the masses in motion are no longer controlled and thus become dangerous, especially for vertical movements;
- the triggered torque limiter must be monitored electrically;
- furthermore, the triggered torque limiter lessens precision, which consequently precludes its being used for high-precision indexing or positioning applications.

An overload protector for mechanical manipulators is already known such as that described in French Patent Application FR A 2.451.250, which relates to materials handling apparatus including two cylindrical cams, the second of which is associated with a roller mounted in such a way that it can oscillate about an axis transverse to that of the cam, so that in combination with a means for disengagement in the case of overload, such as a spring engaging and disengaging means, it can permit a movement of the cam in question without being accompanied by a movement of the grasping means when the latter encounters an obstacle. Nevertheless, the disengagement means used (the spring engaging and disengaging means functioning as a torque limiter) necessitates searching for the initial position of the manipulator arm after use, with the attendant interruption in production.

SUMMARY OF THE INVENTION

The invention seeks to overcome the above disadvantages and to solve the problem of creating a multi-axis mechanical manipulator offering opportunities for travel adjustment, and total protection against overloads, without losing the advantages of the mechanical system in terms of reliability.

The mechanical manipulator according to the invention is characterized principally in that the drive of the indexing mechanism is assured by the combination of a sliding rotor motor, a worm wheel reducing gear, and an adjustable torque limiter. The law of motion of the indexing mechanism is determined so as, in combination with the aforementioned torque limiter, to obtain a constant speed over a wide range, thus offering the possibility of optional stopping and hence of travel adjustment. The rotational motion transmitted to the cylindrical cam is effected via an adjustable torque limiter; and the drive of the manipulator arm is effected via a spring plate with adjustable tension, enabling a momentary angular retraction of the arm when it encounters an obstacle.

The torque limiter of the indexing mechanism is a friction limiter with springs the tension of which is adjustable directly or remotely via jacks.

In a preferred embodiment of the invention, the adjustment of the tension of the springs of the torque limiters of the indexing mechanism and of the cylindrical cam is accomplished remotely via hydraulic jacks, and their function is determined remotely by the programmable robot that assures the management of the manipulator.

The spring bushing that assures the linkage between the rotating frame and the indexing mechanism is made in three parts, stacked one on the other and imbricated in one another with a certain angle of freedom of rotation with respect to one another that is determined by prestressed springs, the deflection of which is a function of the torque transmitted to the bushing.

The adjustable-tension spring plate that enables the angular retraction of the manipulator arm when it encounters an obstacle comprises a hollow shoulder pressed into an indentation made on the arm-holding sliding block, a threaded shaft implanted in the sliding block, on which a spring is mounted, that rests against the hollow shoulder and against the front face of a device for tensioning the spring, and a stop that limits the retraction of the arm by the spring of the plate. In one exemplary embodiment the tensioning is obtained directly, via a washer and a screw nut.

In another exemplary embodiment of the device for tensioning the spring of the plate, this tensioning is obtained via a jack.

The advantages obtained with this invention comprise essentially that the stopping precision obtained is highly reliable, the drive friction torque limiter of the indexing mechanism being adjusted to two or three times the torque necessary for acceleration and braking, so that it slides only upon an intermediate stop where its rated torque is exceeded; each motion has its own friction limiter, with fine adjustment being easy and accessible; the worm wheel reducing gear had reduced play; and each stopping point has an adjustable control cam.

The protection is total, because the disadvantages of the triggering limiters mentioned above are eliminated; the manipulation arm retracts when it encounters obstacles, and the drive friction torque limiter of the cylindrical cam is adjusted to higher than the retraction torque of the manipulating arm.

BRIEF DESCRIPTION OF THE DRAWING

Further characteristics and advantages will become apparent from the ensuing description of a three-axis mechanical manipulator embodied in accordance with the invention, given by way of non-limiting example, in conjunction with the accompanying drawings, which show.

DETAILED DESCRIPTION OF THE PRESENTLY PREFERRED EXEMPLARY EMBODIMENT

Figure 1:
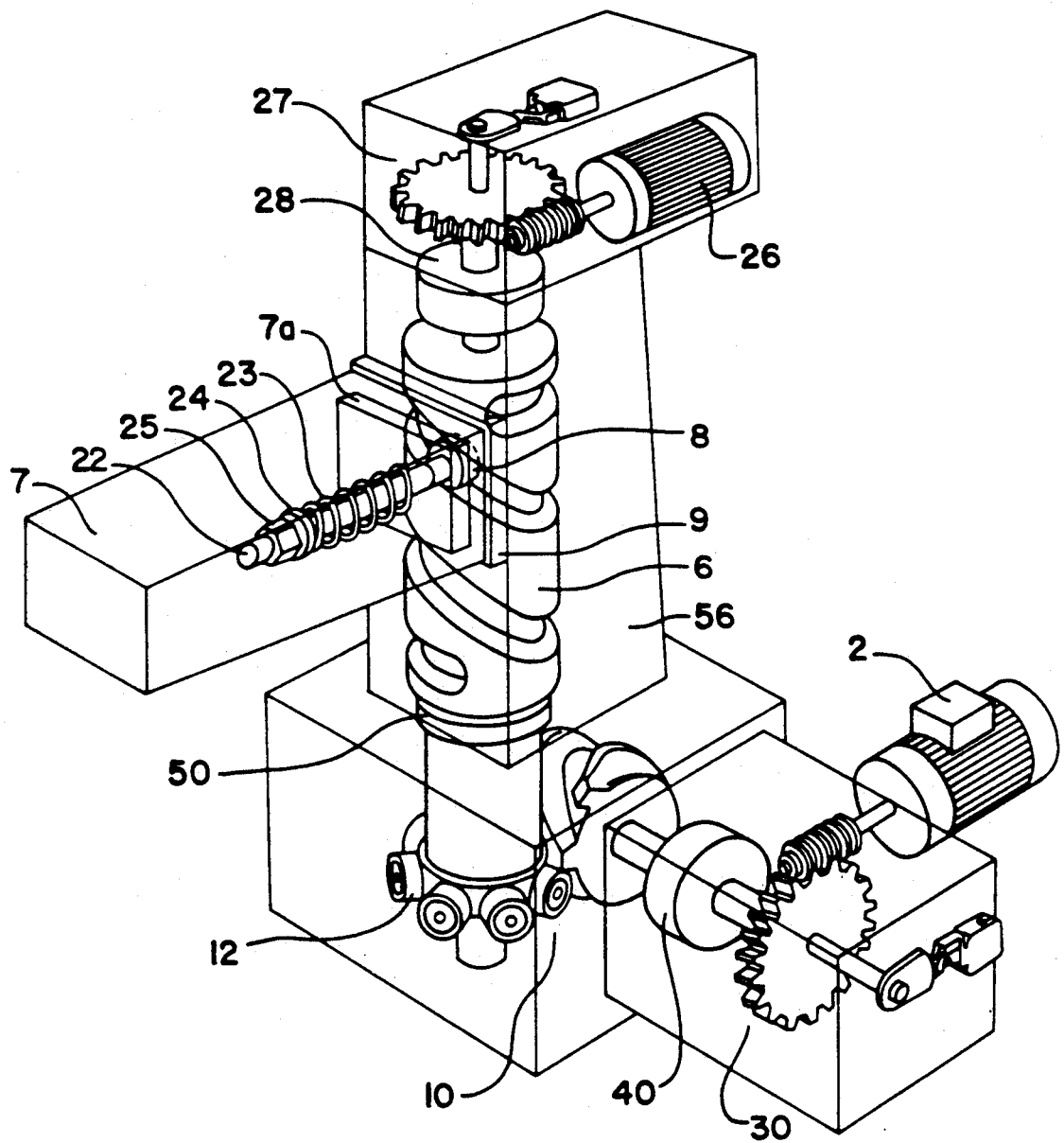
FIG. 1: a perspective view of the entire manipulator.

The drawings show a multi-axis mechanical manipulator with adjustable travel and total protection against overloads, essentially comprising an indexing mechanism 10 driven by the combination of a sliding rotor motor 2, a worm wheel reducing gear 30, and an adjustable torque limiter 40. The indexing mechanism 10 is connected via a spring bushing 50 to a rotating frame 56. A vertical cylindrical cam 6 assures the vertical displacement of a manipulator arm 7 via a roller 8, a sliding block 9, a hollow shoulder 7a, a threaded shaft 22, a spring 23, a washer 24 and a screw nut 25; the rotational drive of the cylindrical cam 6 is obtained via a sliding rotor motor 26, a reducing gear 27 and an adjustable torque limiter 28. A stop 55 limits the angular clearance of the manipulator arm 7.

Figure 4:
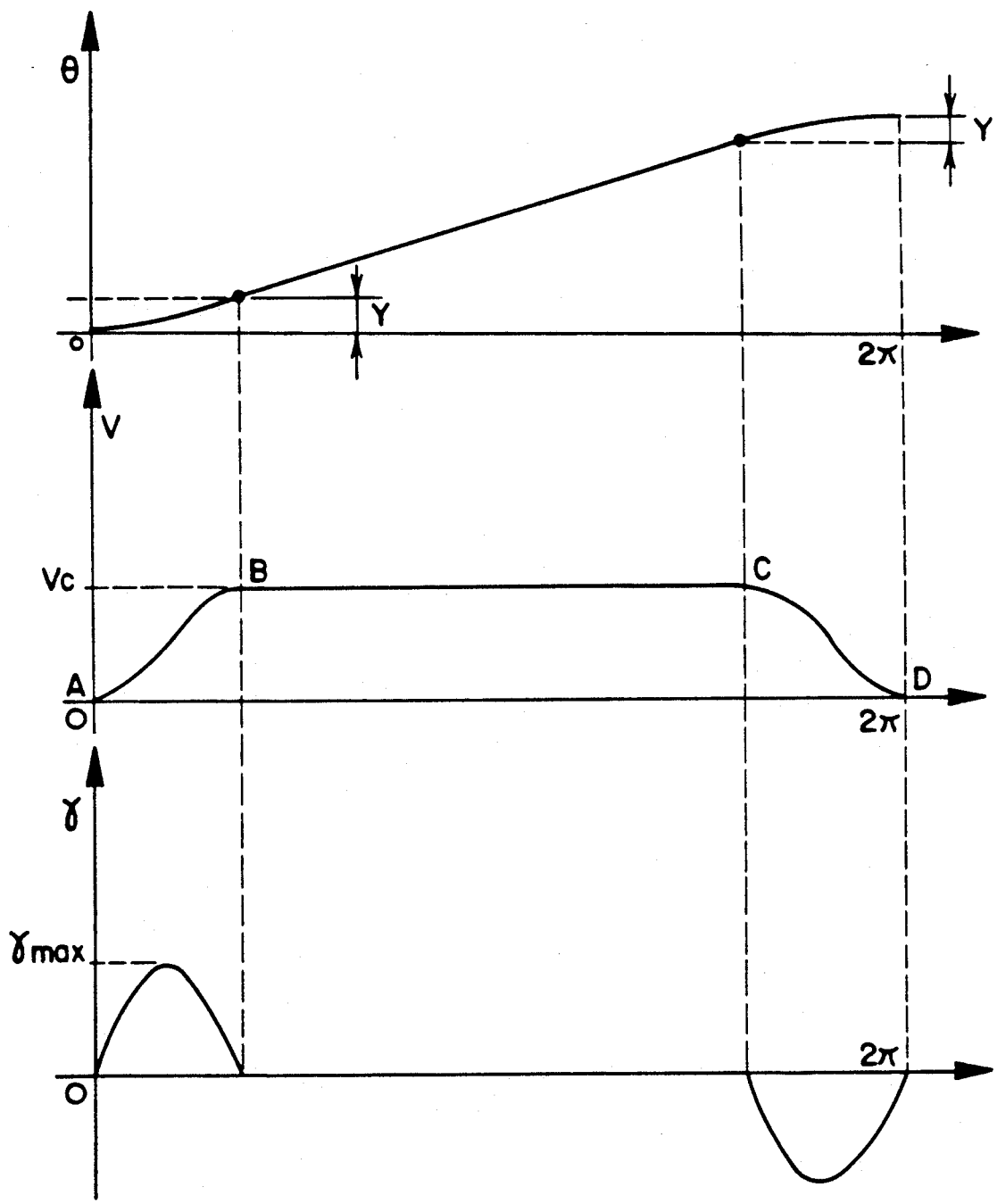
FIG. 4: a graph showing the speed and acceleration as a function of displacement, for one cycle.

Studying FIGS. 1 and 4 shows that the head travel of the manipulator is obtained by the combination of the sliding block rotor 2, the worm wheel reducing gear 30, the adjustable torque limiter 40, the indexing mechanism 10 and the spring bushing 50 integrally connected to the rotating frame 56, by using a law of motion A, B, C, D, which is a function of the angle of rotation over one revolution, reproduced at the indexing mechanism 10 or at the cylindrical cam 6, so that a wide range BC of constant speed Vc can be obtained.

The fact that a constant speed Vc is available over a wide range BC makes it possible to use a less pronounced inclination of ribs, and hence better irreversibility of the reducing gear and the sliding rotor motor, which is highly advantageous.

It is thus possible to mark the stops in the ranges AB, BC and CD. The stops attained in the range BC, at constant speed VC, are characterized by a constancy of the precision of stopping, because they always take place under the same conditions obtained in the zones AB and CD varying contrary to one another from one point to another; the stopping conditions at these points thus vary as well, which means that the stopping precision is variable.

However, in a majority of applications this precision is largely sufficient for numerous apparatuses of this type; this is all the more true since cases do exist where it is necessary to mark an intermediate waiting stop for reasons of safety or to reduce the approach time.

The adjustment of the stopping point and hence of the travel is effected by simple cam adjustment, with each stopping point having one control cam. For three stopping points, for example, the cylindrical cam executes a plurality of revolutions to attain the maximum travel.

For an angular rotation with two stopping points of the indexing mechanism, for example, it is necessary to use two control cams.

As for the total protection of the manipulator the movements of which are obtained via the aforementioned mechanisms, this is accomplished by the combination of a torque limiter 40 for the drive of the indexing mechanism 10, the spring bushing 50 located between the indexing mechanism 10 and the rotating frame 56, and the hollow shoulder 7a with springs 23 the tension of which is adjustable via its threaded shaft 22, a washer 24 and a screw nut 25.

Turning once again to FIGS. 1 and 4, it can be seen that an intermittent rotary motion is protected by the friction torque limiter 40, located downstream of the indexing mechanism 10, only within the constant speed range BC, since in the portions AB and CD, the angle of pressure between the rollers and the cam is low, while at points A and D it equals zero.

Furthermore, to avoid breakage of the rollers 12 of the mechanism 10 in the portions AB and CD of maximum gamma acceleration, the spring bushing 50 (FIG. 2) is placed between the mechanism 10 and the rotating frame 56, so that in the event of blockage of the manipulator arm 7, the indexing mechanism can execute a displacement Y making it possible to cross the point B or the point C to reach the constant speed range BC.

Figure 2:
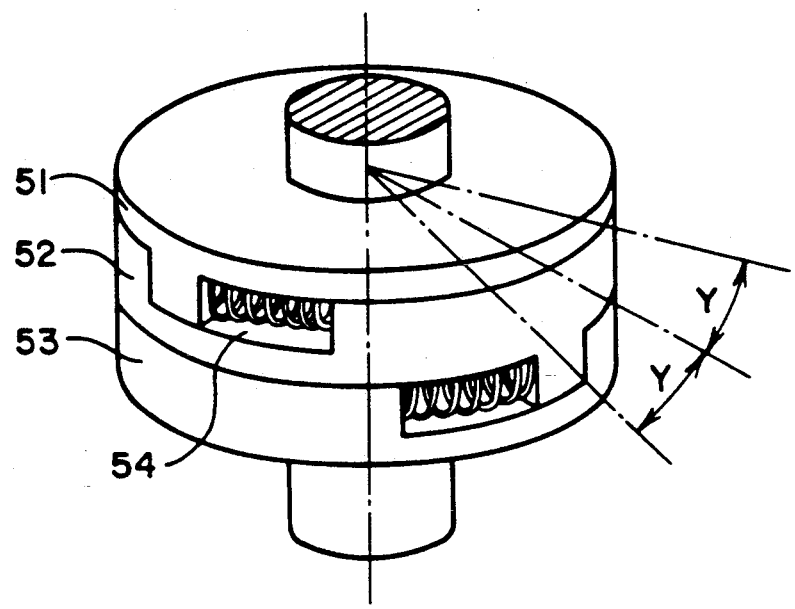
FIG. 2: a perspective view of the spring bushing.

Turning to FIG. 2, it can be seen that in fact the spring bushing 50 that assures the linkage between the indexing mechanism 10 and the rotating frame 56 includes three parts 51, 52 and 53 stacked one on the other and imbricated in one another, with a certain angle Y of maximum clearance freedom of predetermined rotation, in both one direction and the other, by precompressed springs 54.

Turning now once again to FIGS. 1 and 3, it can be seen that in the event of blockage of the rotating frame 56 if the manipulator arm 7 encounters an obstacle, the arm momentarily retracts angularly via the hollow shoulder 7a with springs 23, by laterally rocking on a ridge in the indentation 9a of the sliding block 9 until contact is made with the stop 55.

The clearance Y' is limited by the mechanical stop 55, and the upper torque limiter 28 assures the protection of the roller 8 and the cylindrical cam 6, because in this case this occurs in the portion BC of maximum pressure angle.

Figure 3:
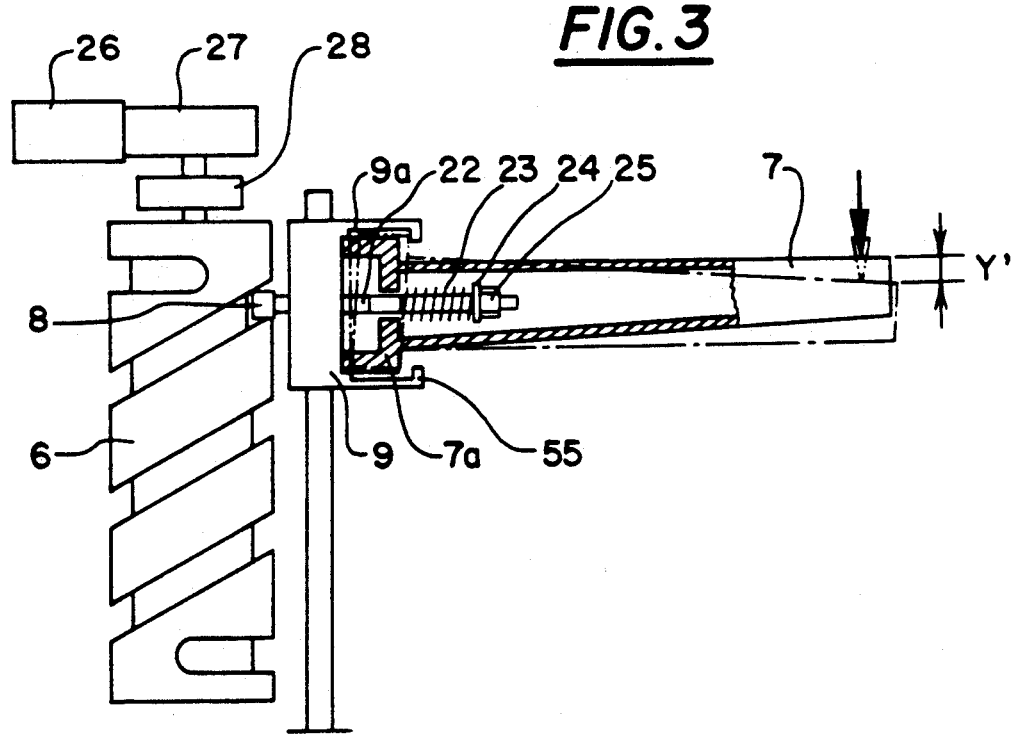
FIG. 3: a side view, partly in section, of the manipulator arm.

The situation is the same when the manipulator arm 7 encounters an obstacle upon moving vertically upward, because then it is inclined as shown in dot-dash lines in FIG. 3, to enable the drive roller 8 to terminate its travel if it is in the portions AB or CD of the cam. In this case once again, the upper torque limiter 28 intervenes to stop the drive of the horizontal cam 6 for vertical displacement Y' of the arm, if the drive roller 8 has not completed its travel.

The protection is thus total, since it is assured on two levels by way of the torque limiters 28 and 40, the spring bushing 50 and the hollow shoulder 7a with springs 23.

In a simplified embodiment of the manipulator, the protection system comprises only the lower torque limiter 40 and the spring bushing 50 for the indexing tables, the plate 7a with springs 23, and the torque limiters 28 and 40, for the multi-axis manipulators.

The manipulator according to the invention is intended for use principally for loading, transfering and unloading parts of any kind.

I claim:

1. A multi-axis mechanical manipulator having adjustable travel and protection against overloads, comprising:
   a worm wheel reducing gear;
   a sliding rotor motor coupled to said gear for driving said worm wheel reducing gear;
   a first adjustable torque limiter connected to said worm wheel reducing gear;
   an indexing mechanism coupled to said torque limiter for receiving motion transmitted by the sliding rotor motor and the first adjustable torque limiter;
   a spring bushing coupled to said indexing mechanism;
   a second worm wheel reducing gear provided so as to turn in a different plane from said first worm wheel reducing gear;
   a second rotor motor coupled to said second gear for driving said second worm wheel reducing gear;
   a second adjustable torque limiter connected to said second worm wheel reducing gear;
   a cylindrical cam coupled to said spring bushing and second adjustable torque limiter;
   a manipulator arm engaged with said cylindrical cam that moves via a drive force from the indexing mechanism and a second drive force from the second rotor motor along said cylindrical cam; and
   a spring plate connected to said manipulator arm for effecting displacement of the manipulator arm;
   wherein motion of the indexing mechanism is determined to obtain a constant speed over a wide range having optional stopping points,
   wherein a linkage of a rotating frame with the indexing mechanism is obtained via the spring bushing, and
   wherein motion is transmitted to the cylindrical cam via the second adjustable torque limiter, and displacement of the manipulator arm is effected in such a manner by the spring plate so as to enable a momentary angular retraction of the arm when it encounters an obstacle.

2. The manipulator of claim 1, wherein the first and second torque limiters that transmit motion to the cylindrical cam and to the indexing mechanism are spring friction limiters having an adjustable force.

3. The manipulator of claim 1, further comprising springs, wherein the spring bushing assuring the linkage between the rotating frame and the indexing mechanism includes three parts stacked one on the other and imbricated in one another with a certain clearance of freedom of rotation with respect to one another determined by the springs, the deflection of which is a function of the torque transmitted to the spring bushing.

4. The manipulator of claim 1, wherein the spring plate enabling angular retraction of the arm when it encounters an obstacle includes:
   an arm-holding sliding block,
   a hollow shoulder pressed into an indentation made in the arm-holding sliding block,
   a spring mounted on the arm-holding block that rests against the hollow shoulder, and
   a device for tensioning the spring having a front face against which the spring also rests.

5. The manipulator of claim 4, wherein the device for tensioning the spring of the plate comprises a washer and a screw nut.

6. The manipulator of claim 4, further comprising a mechanical stop for limiting angular clearance of the arm.

* * * * *